US011171556B2

(12) United States Patent
Makhoul et al.

(10) Patent No.: US 11,171,556 B2
(45) Date of Patent: Nov. 9, 2021

(54) RESONANT POWER CONVERTER AND METHOD FOR CONVERTING A DC INPUT VOLTAGE TO AC OR DC OUTPUT VOLTAGE

(71) Applicant: COMMISSARIAT A L'ENERGIE ATOMIQUE ET AUX ENERGIES ALTERNATIVES, Paris (FR)

(72) Inventors: Rawad Makhoul, Grenoble (FR); Xavier Bourgeois, Moins (FR); Xavier Maynard, Genas (FR); Pierre Perichon, Voiron (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/759,920

(22) PCT Filed: Oct. 30, 2018

(86) PCT No.: PCT/EP2018/079741
§ 371 (c)(1),
(2) Date: Apr. 28, 2020

(87) PCT Pub. No.: WO2019/091833
PCT Pub. Date: May 16, 2019

(65) Prior Publication Data
US 2021/0194344 A1 Jun. 24, 2021

(30) Foreign Application Priority Data
Nov. 9, 2017 (FR) ...................................... 1760531

(51) Int. Cl.
*H02M 1/08* (2006.01)
*H02M 3/155* (2006.01)
(Continued)

(52) U.S. Cl.
CPC ............. *H02M 1/08* (2013.01); *H02M 3/155* (2013.01); *H02M 7/537* (2013.01); *H02M 1/0058* (2021.05); *H02M 7/4815* (2021.05)

(58) Field of Classification Search
CPC ...... H02M 1/08; H02M 1/0058; H02M 7/537; H02M 7/4815; H02M 3/155; H02M 3/338
See application file for complete search history.

(56) References Cited

U.S. PATENT DOCUMENTS

| 4,605,999 A | 8/1986 | Bowman et al. |
| 4,685,041 A * | 8/1987 | Bowman ............... H02M 3/338 363/40 |

(Continued)

FOREIGN PATENT DOCUMENTS

| WO | 2007/082090 A2 | 7/2007 |
| WO | 2014/067915 A2 | 5/2014 |
| WO | 2015/158699 A1 | 10/2015 |

*Primary Examiner* — Kyle J Moody
*Assistant Examiner* — Jye-June Lee
(74) *Attorney, Agent, or Firm* — BakerHostetler

(57) ABSTRACT

A resonant power converter for converting a DC input voltage to AC or DC output voltage, includes a transistor, and a first inductor connected to an input port for a DC voltage to be converted, the drain being connected to the input port by way of the first inductor, the converter furthermore comprising a first resonant network, connected between the drain of the transistor and ground, the first resonant network being configured so as to extract the fundamental component of a drain-source voltage of the transistor and to phase-shift it by a phase shift angle such that the fundamental component and the drain-source voltage are in phase opposition and thus generate a sinusoidal drive signal.

15 Claims, 2 Drawing Sheets

(51) Int. Cl.
*H02M 7/537* (2006.01)
*H02M 7/48* (2007.01)
*H02M 1/00* (2006.01)

(56) References Cited

U.S. PATENT DOCUMENTS

| | | | | |
|---|---|---|---|---|
| 2007/0064457 A1* | 3/2007 | Perreault | ............... | H02M 3/155 363/78 |
| 2007/0171680 A1* | 7/2007 | Perreault | ............... | H02M 3/155 363/16 |
| 2015/0303806 A1* | 10/2015 | Madsen | ................ | H02M 3/158 323/271 |
| 2016/0241128 A1* | 8/2016 | Imai | ....................... | H02M 7/537 |
| 2018/0145608 A1* | 5/2018 | Lin | ......................... | H02M 7/53 |

* cited by examiner

RESONANT POWER CONVERTER AND METHOD FOR CONVERTING A DC INPUT VOLTAGE TO AC OR DC OUTPUT VOLTAGE

CROSS-REFERENCE TO RELATED APPLICATIONS

This application is a National Stage of International patent application PCT/EP2018/079741, filed on Oct. 30, 2018, which claims priority to foreign French patent application No. FR 1760531, filed on Nov. 9, 2017, the disclosures of which are incorporated by reference in their entirety.

FIELD OF THE INVENTION

The invention relates to a very-high-switching-frequency power converter, and to a very-high-switching-frequency power conversion method. The invention is applicable in particular in the conversion of a DC voltage to an AC or DC voltage, in HF and VHF radiofrequency ranges (from 3 to 300 MHz, and notably the free band at 27 MHz). Switching the converter in radiofrequency ranges makes it possible to reduce the size of the reactive components (inductors, capacitors) of the power conversion circuits, and thus to reduce the overall volume of the power conversion chain, which may be advantageous for applications in which compactness and mass are important constraints.

BACKGROUND

In power conversion circuits, switching is performed using a power switch, notably using a field-effect transistor. The transistor switches from the on state to the off state or vice versa, by virtue of a driver circuit called gate drive circuit or gate driver. As a general rule, in power converters, one or more resistors may be added to the gate of the transistor in order to control the voltage or current variations on the transistor at startup of the converter (what is called non-resonant structure). Upon each switching command transmitted by the gate drive circuit to the transistor, energy is dissipated into the resistor or resistors added to the gate of the transistor. For switching frequencies of the order of ten or one hundred kHz, the sum of the losses due to dissipation may be considered to be negligible over a given duration. On the other hand, over the same duration, the sum of the losses due to dissipation is much greater for switching frequencies of the order of ten or one hundred MHz. In order to reduce this kind of dissipation, and to avoid subsequently degrading the efficiency of the converter, a gate drive circuit having what is called a resonant structure may be used, based on passive energy storage components (capacitors and inductors), instead of using a non-resonant structure. The resonant structure, unlike the non-resonant structure, makes it possible to store energy during a switching phase of the transistor, and to output it during the following phase instead of dissipating it into the stray elements of the transistor.

It is also common to use class E converters in the very high frequency range (radiofrequencies). In such converters, a resonant network, formed of an inductor and a capacitor, is placed between the drain of the transistor and the load resistor. The values of the components of the resonant network and of the output capacitance (also called shunt capacitor) of the transistor are selected such that the voltage $V_{DS}$ across the terminals of the transistor is zero during each switching operation of the transistor, from the on state to the off state and vice versa. Since the losses in a transistor are due to the product of the voltage across its terminals and the current flowing through it, a zero voltage at each switching operation makes it possible to minimize the losses. Such operation of the converter without switching losses is called soft switching (ZVS or "Zero Voltage Switching"). Document WO 2014067915 describes a gate drive circuit fora class E converter. The gate drive circuit uses the drain-source voltage Vds to control the gate of the transistor and thus generate a switching signal, and without using an auxiliary voltage source. The gate drive circuit is said to be "self-oscillating".

One of the drawbacks of class E however lies in the presence of a choke coil, connected to the voltage source to be converted, and the role of which is notably to have a current that is as constant as possible in steady state, and thus transform the voltage source into a current source. To achieve this function, the choke coil has to have a high value, which prevents it from being integrated onto a printed circuit board. The choke coil then has to be arranged separately from the converter, thereby adding mass, and may be prohibitive for certain applications in which mass is a critical parameter. A second drawback linked to class E lies in the very high voltage stress on the transistor. The drain-source voltage (Vds) is specifically approximately equal to four times the input voltage, which involves using a transistor with a relatively high on-state resistance $R_{DSON}$ that affects the efficiency of the transistor.

The class Φ2 (Phi2) converter makes it possible to overcome the abovementioned drawbacks. A class Φ2 converter, illustrated in FIG. 1, comprises an input inductor L1, connected to the voltage source $V_{IN}$ to be converted, and having a value of the same order of magnitude as the inductor L3 of the resonant network L3-C3. It also comprises a filter L2-C1, the resonant frequency of the filter L2-C1 being equal to twice the switching frequency of the transistor. The gate of the transistor is controlled by the gate drive circuit 12. The filter L2-C1 is added in parallel with the transistor in order to short-circuit the second harmonic of the drain-source voltage of the transistor and thus reduce the voltage stress on the transistor. Such a structure is easily able to be integrated onto a printed circuit board, due to the low value of the input inductance. The absence of a high-value inductor (the choke coil in the class E converter) also makes it possible to achieve a shorter transient, which may be advantageous for making rapid power calls in the converter. FIG. 2 illustrates the waveform of the drain-source voltage Vds in a class Φ2 converter, at a switching frequency of 30 MHz. During the switching operation (at around 34 ns in FIG. 2), the voltage Vds is virtually zero, and the soft switching condition (ZVS) is thus complied with. Furthermore, the time derivative of the voltage Vds is also virtually zero, thereby making it possible to achieve operation of the converter with maximum efficiency. The input voltage is equal to 20 V, and the drain-source voltage is equal to approximately twice the input voltage, thereby limiting the voltage stress on the transistor. By reducing the voltage stress, it is then possible either to increase efficiency, with an on-state resistance $R_{DSON}$ lower than for a class E converter, or to increase compactness, by reducing the size of the chip on which the various elements of the conversion circuit are located. In addition, the lower voltage stress makes it possible to consider the stray capacitance as being more stable in terms of value, thereby making it easier to model. The gate drive circuit, described previously in document WO 2014067915, is well suited to a class E converter. However, this gate drive circuit is not suitable for the waveforms of class Φ2 converters.

A gate drive circuit for a class Φ2 converter is described in document WO 2007/082090. The circuit disclosed in this document makes it possible to generate a (sinusoidal or square) switching signal for the gate of the transistor of the class Φ2 converter. For this purpose, it uses an additional transistor, in addition to the transistor of the converter, thereby introducing stray elements into the circuit, potentially making the switching frequency of the transistor unstable. The disclosed circuit also comprises an external voltage source, in addition to the DC voltage source to be converted, thereby increasing the overall mass of the converter.

SUMMARY OF THE INVENTION

One aim of the invention is therefore to achieve a self-oscillating gate drive circuit, that is to say one not involving an additional voltage source or an additional transistor, for a class Φ2 DC voltage converter.

One subject of the invention for partly or fully achieving this aim is a resonant power converter for converting a DC input voltage to AC or DC output voltage, comprising a power switch provided with a control electrode, a first electrode and a second electrode connected to the ground of the converter, and a first inductor connected to an input port for a DC voltage to be converted, the first electrode being connected to the input port by way of the first inductor, the converter furthermore comprising a first resonant network, connected between the first electrode of the power switch and ground, the first resonant network being configured so as to extract the fundamental component of a voltage between the first electrode and the second electrode of the power switch and to phase-shift it by a phase shift angle such that said fundamental component and the voltage between the first electrode and the second electrode are in phase opposition and thus generate a sinusoidal drive signal, the converter also comprising a capacitive divider bridge connected between the first resonant network and the control electrode of the power switch in order to limit the amplitude of the sinusoidal drive signal for the control electrode of the power switch.

Advantageously, the first resonant network comprises an oscillating network configured so as to generate and maintain, using the power switch, oscillations at a desired switching frequency, and a filtering module for filtering the DC component of said oscillations, connected between the oscillating network and the divider bridge.

Advantageously, the phase shift angle is substantially equal to 180°.

Advantageously, the converter comprises a first series resonant circuit, connected between the first electrode and ground, and configured so as to resonate at a frequency equal to twice the switching frequency.

Advantageously, the first series resonant circuit comprises a first capacitor and a second inductor.

Advantageously, the drain is connected to an output port of the converted voltage by way of a second series resonant circuit.

Advantageously, the second series resonant circuit comprises a third inductor connected in series with a third capacitor.

Advantageously, the oscillating network comprises a second capacitor in parallel with an assembly formed of a fourth inductor connected in series with a fifth capacitor and with a sixth capacitor, forming a Clapp oscillator with the transistor, the filtering module being connected to the oscillating network at the terminals of the sixth capacitor.

Advantageously, the oscillating network comprises a second capacitor in parallel with an assembly formed of a fourth inductor connected in series with a sixth capacitor, forming a Colpitts oscillator with the transistor, the filtering module being connected to the oscillating network at the terminals of the sixth capacitor.

Advantageously, the filtering module forms a low-pass LC filter, formed of a fifth inductor connected to the sixth capacitor and to the divider bridge, and of a seventh capacitor connected to the divider bridge and to ground.

Advantageously, the capacitive divider bridge comprises an eighth capacitor, connected to the first resonant network and to the control electrode of the power switch, and a fourth capacitor, connected between the control electrode of the power switch and ground.

Advantageously, the switching frequency is set between 3 MHz and 300 MHz.

Another subject of the invention is a power conversion method for converting a DC input voltage to AC or DC output voltage in a resonant power converter comprising a power switch provided with a control electrode, a first electrode and a second electrode connected to the ground of the converter, and a first inductor connected to an input port for a DC voltage to be converted, the first electrode being connected to the input port by way of the first inductor, the method comprising the following steps:

Extraction, by a first resonant network connected between the first electrode of the power switch and ground, of the fundamental component of a voltage between the first electrode and the second electrode of the power switch, Phase-shifting the fundamental component by a phase shift angle such that said fundamental component and the voltage between the first electrode and the second electrode are in phase opposition, said phase-shifted fundamental component forming a sinusoidal drive signal, Reducing the amplitude of the sinusoidal drive signal for the control electrode of the power switch.

Advantageously, the method furthermore comprises an initial step of generating and maintaining oscillations at a switching frequency of the power switch.

Advantageously, the method furthermore comprises a step of filtering the DC component of said oscillations, between the step of phase-shifting the fundamental component and the step of reducing the amplitude of the signal.

BRIEF DESCRIPTION OF THE DRAWINGS

Other features, details and advantages of the invention will emerge upon reading the description, given with reference to the attached drawings that are given by way of example.

DETAILED DESCRIPTION

The invention is described in the case where the power switch is a field-effect transistor (for example MOSFET, JFET). The substrate of the transistor may be made of gallium nitride (GaN), of silicon carbide (SiC), or using any other material. The drain, the source and the gate that are mentioned in the description may more generally be denoted by a first electrode, a second electrode and a control electrode, respectively. The invention may thus also be applied to other types of power switch (for example an IGBT transistor, a bipolar transistor or even a thyristor).

Figure 3:
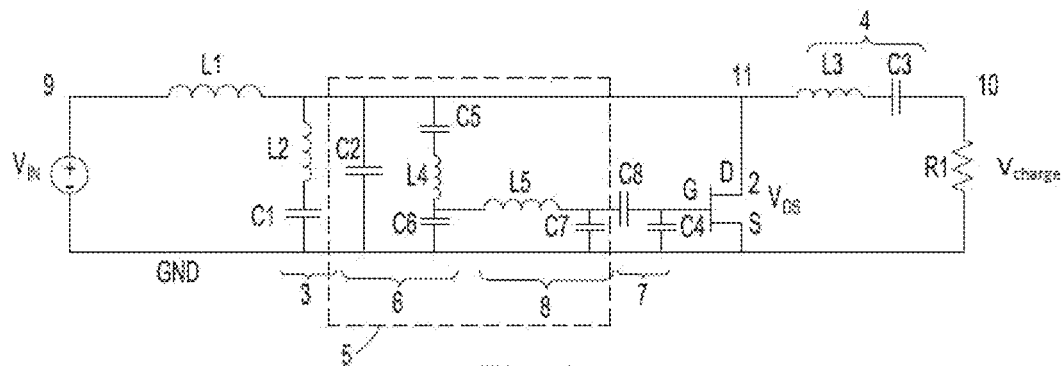
FIG. 3 shows an electrical circuit of a class Φ2 converter equipped with a gate drive circuit according to a first embodiment of the invention, operating with a Clapp oscillator.

FIG. 3 shows an electrical circuit of a class Φ2 converter equipped with a gate drive circuit according to a first embodiment of the invention. A DC voltage Vin is applied to the input of the converter, between the input port of the voltage to be converted 9 and ground GND. A first inductor L1 is connected between the input port 9 and a node 11 to which the drain of the transistor 2 to be switched at a switching frequency $f_0$ is connected. A second inductor L2 and a first capacitor C1 form a first series resonant circuit 3, connected between the node 11 and ground GND, and configured so as to resonate at a frequency equal to twice the switching frequency $f_0$ of the transistor, which corresponds substantially to the second harmonic of the switching frequency $f_0$, in order to reduce the voltage stress on the transistor.

Figure 1:
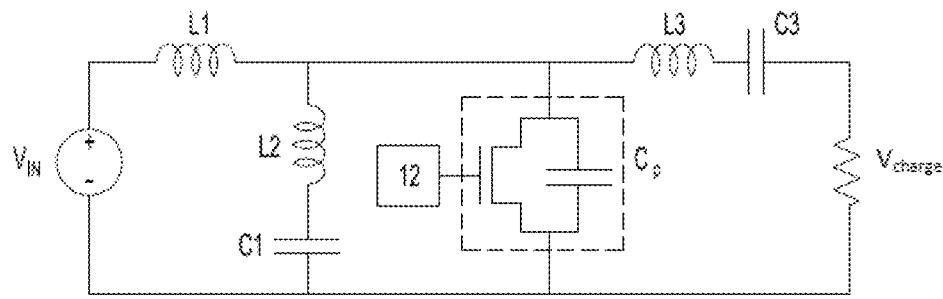
FIG. 1 shows a class Φ2 converter.

A second series resonant circuit 4, comprising a third inductor L3 connected in series with a third capacitor C3, is connected between the node 11 and the output port 10 of the converted voltage. The converted voltage is shown schematically in FIG. 3 by a load resistor R1. The second capacitor C2 represents the output capacitance of the transistor Cp, shown in FIG. 1, as well as an optional additional capacitor Copt, not shown. The higher the switching frequency, the smaller the capacitance of the second capacitor C2, the second capacitor C2 may then be formed solely of the stray capacitance Cp, without having to add an optional additional capacitor Copt. The second capacitor C2, the fifth capacitor C5, the fourth inductor L4 and the sixth capacitor C6 form an oscillating network 6. The oscillating network 6 according to the invention thus advantageously uses certain stray components of the transistor, notably its output capacitance Cp. The assembly formed of the oscillating network 6 and the transistor 2 forms a Clapp oscillator, whose role is to create oscillations from the DC input voltage Vin. The oscillations are maintained in the gate drive circuit, at a given frequency $f_0$. The Clapp oscillator has the advantage of being particularly stable in terms of frequency, notably in the radiofrequency range. By simplifying the depiction of the oscillating network 6, the second capacitor C2 is shown between the first series resonant circuit 3 and the branch of the oscillating network 6 formed of the fifth capacitor C5, of the fourth inductor L4 and of the sixth capacitor C6. However, the second capacitor C2 could also be shown "to the right" of the transistor, to better illustrate the fact that it partly represents the output capacitance of the transistor Cp.

Figure 2:
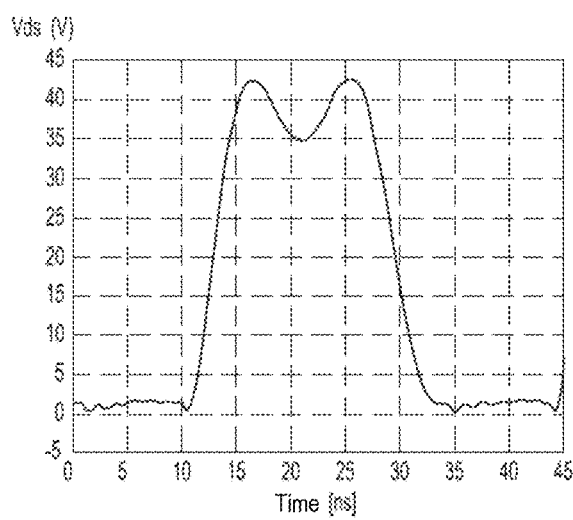
FIG. 2 shows a waveform of the drain-source voltage $V_{DS}$ of a class Φ2 converter.

A low-pass LC filtering module 8, formed of a fifth inductor L5 and of a seventh capacitor C7, taps off the voltage across the terminals of the sixth capacitor C6 at input; the output signal from the filtering module 8 is recovered at the terminals of the seventh capacitor C7. The role of this filtering module 8 is to extract the fundamental component of the drain-source voltage signal Vds received by the Clapp oscillator, the waveform of which is illustrated in FIG. 2, in order to remove all of the harmonics therefrom. Moreover, the values of the reactive elements (capacitors and inductors) of the filtering module 8 and of the oscillating network 6 are determined such that the fundamental component of the drain-source voltage signal Vds, at the output of the filtering module 8, and the drain-source voltage Vds are in phase opposition, preferably phase-shifted by a value substantially equal to 180°. A capacitive divider bridge 7, formed of a fourth capacitor C4 and of an eighth capacitor C8, makes it possible both to eliminate the DC component of the voltage across the terminals of the seventh capacitor C7 and to reduce the amplitude of the signal from the gate drive circuit. The value of the fourth capacitor C4 is determined depending on the DC component to be eliminated. The value of the eighth capacitor C8 is determined depending on the amplitude reduction to be applied. A sinusoidal drive signal is thus obtained at the output of the capacitive divider bridge 7.

The sinusoidal drive signal represents the output signal from the gate drive circuit. With reference to FIG. 2, when the voltage Vds is non-zero, the phase shift of 180° and the elimination of the DC component result in a sinusoidal drive signal below the threshold voltage (Vgsth) of the transistor. The transistor is therefore in the off state, and therefore no current flows through it. With continuing reference to FIG. 2, when the voltage Vds is zero or virtually zero (for example below a certain threshold), the sinusoidal drive signal is above the threshold voltage (Vgsth) of the transistor, and the transistor changes to the on state, thus with a non-zero current flowing through it. The operation of the soft switching converter (ZVS) is therefore indeed complied with, limiting switching losses, without the need to use an additional voltage source or other active components. The gate drive circuit is then said to be self-oscillating.

Figure 4:
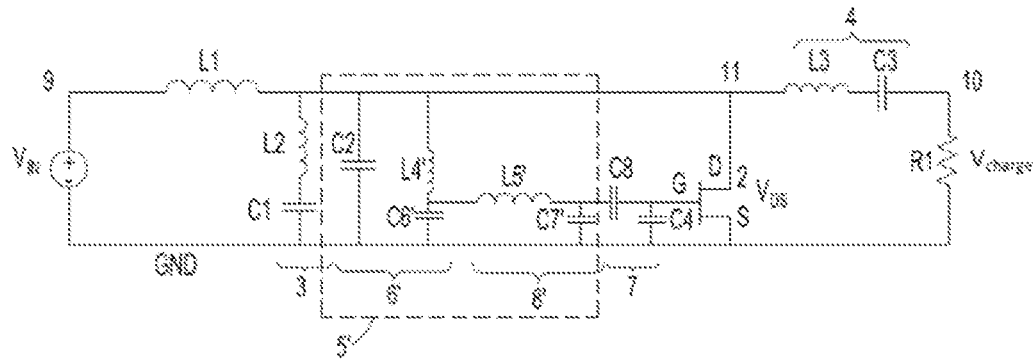
FIG. 4 shows an electrical circuit of a class Φ2 converter equipped with a gate drive circuit according to a second embodiment of the invention, operating with a Colpitts oscillator.

The embodiment illustrated in FIG. 4 differs from the embodiment illustrated in FIG. 3 through the oscillating network. In FIG. 4, the transistor 2 and the oscillating network 6' form a Colpitts oscillator. The Colpitts oscillator comprises one fewer capacitor compared to the Clapp oscillator. Having one fewer capacitor advantageously makes it possible to reduce dissipations due to stray elements of the capacitor, and thus to increase the efficiency of the converter, also with a lower mass. The numerical values of the fourth inductor L4', of the sixth capacitor C6', of the fifth inductor L5' and of the seventh capacitor C7' may differ from the numerical values of the corresponding components of the Clapp oscillator, in order to account for the absence of the fifth capacitor C5.

Figure 5:
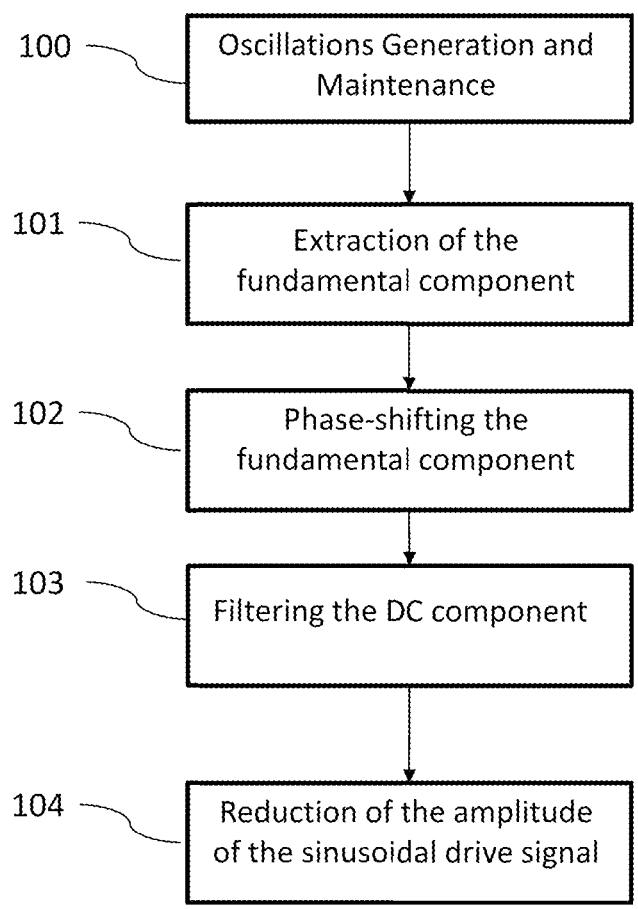
FIG. 5 schematically shows the various steps of a method according to the invention.

FIG. 5 schematically illustrates the various steps of the power conversion method according to the invention. In step 100, the oscillating network (6, 6') and the transistor 2 generate and maintain oscillations at a switching frequency $f_0$ of the transistor 2, as soon as a DC voltage Vin is present. In step 101, the first resonant network 5 extracts the fundamental component of the drain-source voltage $V_{DS}$ of the transistor 2. In step 102, the fundamental component of the drain-source voltage $V_{DS}$ of the transistor is phase-shifted by a phase shift angle such that said fundamental component and the drain-source voltage $V_{DS}$ are in phase opposition. In step 103, the DC component of the phase-shifted fundamental component is filtered by the capacitive divider bridge 7, in order to obtain a sinusoidal signal for driving the gate of the transistor 2. The amplitude of this signal may be limited in step 104, compared to the level required by the gate of the transistor 2.

The following paragraph describes one non-limiting example of a method for dimensioning the components of the gate drive circuit, for an oscillating frequency $f_0$ equal to 100 MHz, taking into account the numerical values of the components of the Φ2 structure of the converter at this frequency.

For a DC input voltage of 20 V, and delivering an output power of around 2 W to a resistive load of 100Ω, the value of 5 nH may be assigned to the first inductor, the value of 3.3 nH may be assigned to the second inductor, the value of 188 pF may be assigned to the first capacitor, the value of 340 nH may be assigned to the third inductor, and the value of 15 pF may be assigned to the third capacitor. Dimensioning the Clapp oscillator consists in determining the values of the second capacitor C2, of the fifth capacitor C5, of the fourth inductor L4 and of the sixth capacitor C6. In order to reduce the current absorbed in the gate drive circuit, a value of the fourth inductor L4 is set that is much higher than that of the first inductor L1 but lower than that of the third inductor L3. It is therefore possible to set L4=100 nH. The value of the second capacitor C2 may be given by the output capacitance of the transistor 2, substantially equal to 200 pF. It is then possible to set C5=C2=200 pF.

The value of the sixth capacitor C6 is calculated by the formula for the oscillating frequency of the Clapp oscillator:

$$f0 = \frac{1}{2\pi}\sqrt{\frac{\left(\frac{1}{C2}+\frac{1}{C5}+\frac{1}{C6}\right)}{L4}}$$

Knowing the value of C2, C5, L4 as well as the oscillating frequency, which it is desired to set at 100 MHz, a possible value of the sixth capacitor C6 is found. This value may be modified depending on the dimensioning of the components of the filtering module 8.

Dimensioning the low-pass LC filter filtering module 8, the role of which is to extract the fundamental component of the drain-source voltage signal received by the Clapp oscillator and to phase-shift it by 180°, consists in determining the value of the fifth inductor L5 and of the equivalent capacitance of the filter $C_{filter}$ of the filtering module 8, which takes into account the fourth capacitor C4, the seventh capacitor C7 and the eighth capacitor C8. A first condition to be imposed on the filtering module 8 is that the resonant frequency of the filtering module, determined by the fifth inductor L5 and by the equivalent capacitance of the filter $C_{filter}$, must be between the oscillating frequency of the Clapp oscillator ($f_0$, here 100 MHz) and twice this same frequency (here 200 MHz), so as not to select higher-order harmonics. This results in the equation:

$$f0 < \frac{1}{2\pi\sqrt{L5.C_{filtre}}} < 2.f0$$

A second condition to be imposed on the filtering module 8 is the phase shift of 180° at the output of the filtering module 8. For this purpose, the transfer function of the LC filter is calculated, this being given by:

$$H(\omega) = \frac{1}{1 - L5.C_{filtre}.\omega^2}$$

Where $\omega = 2\pi \cdot f_0$

In order to achieve a phase shift of 180° at the output of the filtering module 8, the transfer function H is required to be a negative real number, which results in:

$$L5 \cdot C_{filter} \cdot \omega^2 > 1$$

The two set conditions make it possible to have possible values for L5 and $C_{filter}$.

Dimensioning the capacitive divider bridge 7 consists in determining the values of the fourth capacitor C4, of the seventh capacitor C7 and of the eighth capacitor C8. It is noted that:

$$C_{filtre} = \frac{C_8 \cdot C_4}{C_8 + C_4} + C_7$$

By defining a reduction ratio of 1/9 for the capacitive divider bridge 7, the following is then obtained:

$$C_4 = 8 \cdot C_8$$

The value of the fourth capacitor C4 is defined according to the DC component to be eliminated from the signal from the filtering module. For a DC component equal to 6 V, a value of C4=200 pF may be suitable. A value of C8=1600 pF is obtained, thereby making it possible to determine the value of the seventh capacitor C7 from the possible values for L5 and $C_{filter}$ defined above. It should be noted that the sixth capacitor C6, the fifth inductor L5 and the seventh capacitor C7 form a Chebyshev filter. The value of the sixth capacitor C6 may then be modified so as to correspond to the values of the normalized coefficients from the normalization table of the Chebyshev components.

The method for dimensioning the components of the gate drive circuit is identical for a Colpitts oscillator, illustrated in FIG. 4. The Colpitts oscillator is distinguished from the Clapp oscillator by one fewer capacitor (the fifth capacitor C5), which has an influence on the numerical values of the various components of the gate drive circuit.

The invention claimed is:

1. A resonant power converter for converting a DC input voltage to AC or DC output voltage, comprising a power switch provided with a control electrode, a first electrode and a second electrode connected to ground of the resonant power converter, and a first inductor connected to an input port for a DC voltage to be converted, the first electrode being connected to the input port by way of the first inductor,
wherein the resonant power converter further comprises a first resonant network, connected between the first electrode of the power switch and ground, the first resonant network being configured so as to extract a fundamental component of a voltage between the first electrode and the second electrode of the power switch and to phase-shift the fundamental component by a phase shift angle such that said fundamental component and the voltage between the first electrode and the second electrode are in phase opposition and thus generate a sinusoidal drive signal, the resonant power converter also comprising a capacitive divider bridge connected between the first resonant network and the control electrode of the power switch in order to limit an amplitude of the sinusoidal drive signal for the control electrode of the power switch.

2. The resonant power converter as claimed in claim 1, the first resonant network comprising an oscillating network configured so as to generate and maintain, using the power switch, oscillations at a desired switching frequency, and a filtering module for filtering a DC component of said oscillations, connected between the oscillating network and the divider bridge.

3. The resonant power converter as claimed in claim 2, comprising a first series resonant circuit, connected between the first electrode and ground, and configured so as to resonate at a frequency equal to twice the switching frequency.

4. The resonant power converter as claimed in claim 3, the first series resonant circuit comprising a first capacitor and a second inductor.

5. The resonant power converter as claimed in claim 2, the oscillating network comprising a second capacitor in parallel with an assembly formed of a fourth inductor connected in series with a fifth capacitor and with a sixth capacitor, forming a Clapp oscillator with the power switch, the filtering module being connected to the oscillating network at terminals of the sixth capacitor.

6. The resonant power converter as claimed in claim 5, the filtering module forming a low-pass LC filter, formed of a fifth inductor connected to the sixth capacitor and to the capacitive divider bridge, and a seventh capacitor connected to the capacitive divider bridge and to ground.

7. The resonant power converter as claimed in claim 2, the oscillating network comprising a second capacitor in parallel with an assembly formed of a fourth inductor connected in series with a sixth capacitor, forming a Colpitts oscillator with the power switch, the filtering module being connected to the oscillating network at terminals of the sixth capacitor.

8. The resonant power converter as claimed in claim 2, the switching frequency being set between 3 MHz and 300 MHz.

9. The resonant power converter as claimed in claim 1, the phase shift angle being substantially equal to 180°.

10. The resonant power converter as claimed in claim 1, the first electrode being connected to an output port by way of a second series resonant circuit.

11. The resonant power converter as claimed in claim 10, the second series resonant circuit comprising a third inductor connected in series with a third capacitor.

12. The resonant power converter as claimed in claim 1, the capacitive divider bridge comprising an eighth capacitor, connected to the first resonant network and to the control electrode of the power switch, and a fourth capacitor, connected to the control electrode of the power switch and ground.

13. A power conversion method for converting a DC input voltage to AC or DC output voltage in a resonant power converter comprising a power switch provided with a control electrode, a first electrode and a second electrode connected to ground of the resonant power converter, and a first inductor connected to an input port for a DC voltage to be converted, the first electrode being connected to the input port by way of the first inductor,
wherein the method comprises steps:
extraction, by a first resonant network connected between the first electrode of the power switch and ground, of a fundamental component of a voltage between the first electrode and the second electrode of the power switch,
phase-shifting the fundamental component by a phase shift angle such that said fundamental component and the voltage between the first electrode and the second electrode are in phase opposition, said phase-shifted fundamental component forming a sinusoidal drive signal,
reducing an amplitude of the sinusoidal drive signal for the control electrode of the power switch.

14. The power conversion method as claimed in claim 13, furthermore comprising an initial step of generating and maintaining oscillations at a switching frequency of the power switch.

15. The method as claimed in claim 14, further comprising a step of filtering a DC component of said oscillations, between the step of phase-shifting the fundamental component and the step of reducing the amplitude of the signal.

* * * * *